United States Patent [19]

Walton

[11] Patent Number: 4,600,829
[45] Date of Patent: Jul. 15, 1986

[54] ELECTRONIC PROXIMITY IDENTIFICATION AND RECOGNITION SYSTEM WITH ISOLATED TWO-WAY COUPLING

[76] Inventor: Charles A. Walton, 19115 Overlook Rd., Los Gatos, Calif. 95030

[21] Appl. No.: 596,065

[22] Filed: Apr. 2, 1984

[51] Int. Cl.⁴ .................................................. G06K 7/00
[52] U.S. Cl. ................................... 235/439; 235/492; 340/825.34; 343/6.8 LC; 455/41
[58] Field of Search .............................. 235/439, 492; 340/825.31, 825.34; 343/6.8 R, 6.8 LC; 455/41

[56] References Cited

U.S. PATENT DOCUMENTS

| | | |
|---|---|---|
| 3,163,860 | 12/1964 | Bailey .......................... 343/6.8 LC |
| 3,182,314 | 5/1965 | Kleist et al. ...................... 343/6.8 R |
| 3,299,424 | 1/1967 | Vinding . |
| 3,427,614 | 2/1969 | Vinding . |
| 3,440,633 | 4/1969 | Vinding . |
| 3,732,465 | 5/1973 | Palmer . |
| 3,752,960 | 8/1973 | Walton . |
| 3,755,803 | 8/1973 | Cole et al. . |
| 3,832,530 | 8/1974 | Reitboeck et al. . |
| 3,929,277 | 12/1975 | Byrne et al. . |
| 4,196,418 | 4/1980 | Kip et al. . |
| 4,242,663 | 12/1980 | Slobodin .................... 340/825.34 X |
| 4,388,524 | 6/1983 | Walton . |

Primary Examiner—David L. Trafton
Attorney, Agent, or Firm—Thomas E. Schatzel

[57] ABSTRACT

An electronic proximity identification and recognition system. The identification and recognition sections are physically separate from one another, but inductively coupled to one another by two-way coupling. The identification section and recognition section each have a sending and a receiving antenna. The antennas in each section are structured to have virtually zero mutual inductance.

12 Claims, 3 Drawing Figures

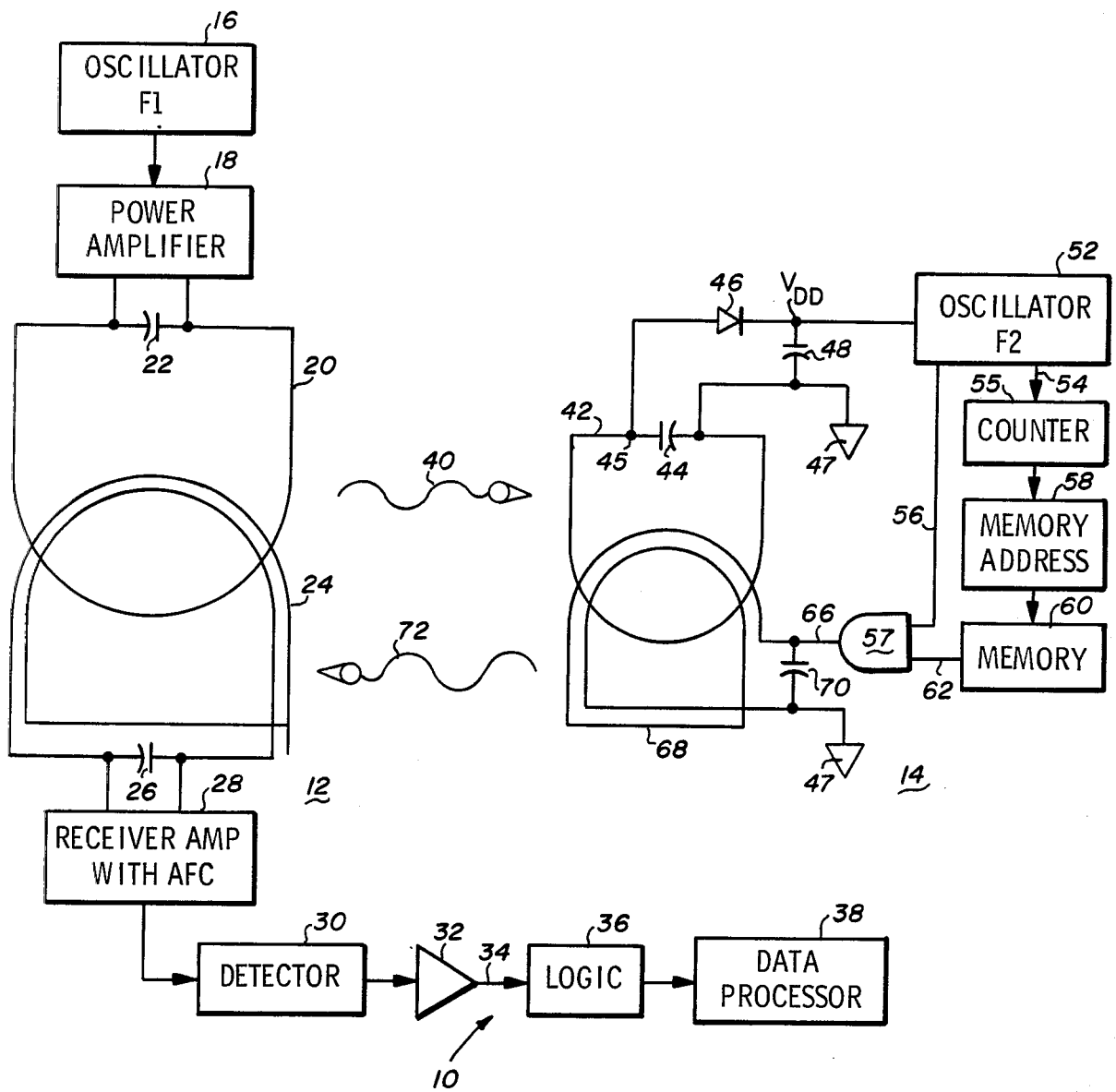
Fig_1

ELECTRONIC PROXIMITY IDENTIFICATION AND RECOGNITION SYSTEM WITH ISOLATED TWO-WAY COUPLING

BACKGROUND OF THE INVENTION

1. Field of the Invention

This invention relates to an electronic proximity identification and recognition system and more particularly to such a system wherein there is no physical contact between the identification card and recognition apparatus.

2. Description of the Prior Art

There are various electronic identification and recognition systems wherein the identifying device is portable. Sometimes the identifying device is referred to as a "card", "tag", "key", or the like. The recognition station or reader station is prepared to recognize identifying devices of predetermined characteristics when such identifying device is brought within the proximity of the reader station. Inductive coupling takes place between the two devices when they are proximate to one another and it is not necessary to bring the device into physical contact.

Uses for such systems may include identification of persons having identifying devices in their possession. For example, the identifying device may take the shape of a credit card having an electronic circuit embedded therein for radiating signals of identifying intelligence. An individual possessing the card may position it adjacent a door that they want to enter. A recognition device may be arranged to control the door latch. Thus, if it recognizes radiated signals of certain predetermined intelligence, the door latch responds to the reader when the individual places the "card" proximate to the reader. Other uses for such systems include having the identifier in the form of a tag attached to a vehicle to be identified. Also, in production lines, garments or items may carry identifying tags so that they can be appropriately processed as they are recognized along various points in the production processes.

The prior art includes various patents by the present inventor including U.S. Pat. No. 3,752,960 for "Electronic Identification and Recognition System", issued Aug. 14, 1973; U.S. Pat. No. 3,816,708 for "Electronic Recognition and Identification System", issued June 11, 1974; U.S. Pat. No. 3,816,709 for "Electronic Identification and Recognition System", issued June 11, 1974; U.S. Pat. No. 4,142,674 for "Recognition and Identification Key Having Adaptable Resonant Frequency and Methods of Adapting Same", issued Mar. 6, 1979; U.S. Pat. No. 4,223,830 for "Identification System" issued Sept. 23, 1980; U.S. Pat. No. 4,236,068 for "Personal Identification and Signaling System" issued Nov. 25, 1980; U.S. Pat. No. 4,384,288 for "Portable Radio Frequency Emitting Identifier" issued on May 17, 1983; and U.S. Pat. No. 4,388,524 for "Electronic Identification and Recognition with Code Changeable Reactants" issued June 14, 1983.

Also, the prior art includes U.S. Pat. No. 3,732,465 for "Electronic Sensing and Actuator System", issued May 8, 1973 to Ronald S. Palmer and Charles A. Walton; U.S. Pat. No. 3,842,246 for "Recognition and Identification System with Noise Rejection Capabilities" by Robert D. Kohler, David P. Sidlauskas and Charles A. Walton, issued May 18, 1976; U.S. Pat. No. 3,958,105 for "Electronic Recognition and Identification System for Identifying Several Master Keys", issued May 18, 1976 to David P. Sidlauskas; and U.S. Pat. No. 3,970,824 for "Electronic Recognition and Identification System for Identifying a Family of Codes" by Charles A. Walton, Robert D. Kohler and David P. Sidlauskas, issued July 20, 1976.

In the electronic portable recognition and identifier systems of the prior art, there are two directions of communications between the reader and the identifier devices. The reader (recognition station), which is typically stationary, must send an interrogation signal and/or power to the identifier device (e.g. card, tag, key), which is typically portable. In response, the identifier device sends a coded signal bearing intelligence about its identification to the reader. Means must be provided so that the two directions of communication and power do not interfere to the extent of inhibiting the desired transfers. In the general class of electronic portable identification and recognition systems, inductive coupling is used between the reader and the identifier, as contrasted with electric field dipols antenna coupling systems. A further characteristic is that often both power and data are transmitted over the same inductively coupled coils. In some of the referenced prior art, non-interference between the two paths of the reader and identifier is achieved by engineering principles such as time separation, or differing frequencies, or by modulation of the electromagnetic power field and detection of such modulation in the radiated reader field. A disadvantage of time separation is increased total transaction time. A disadvantage of differing frequencies is that the coil of the portable identifier cannot be tuned simultaneously to two different frequencies. Such inability to tune, makes one direction inefficient. A disadvantage of power field modulation is that power losses occur in the identifier when the identifier modulates the power field.

SUMMARY OF THE PRESENT INVENTION

It is an object of the present invention to provide an identification and recognition system wherein the two directions of communication are isolated from one another.

It is a further object of the present invention to provide an identification and recognition system wherein the available choices of identifiable codes is indefinite.

In a preferred embodiment of the present invention, the system includes separate coils for transmitting and receiving in the reader and separate coils for transmitting and receiving in the identifier. The identifier is portable and contains identification data which the reader receives and interrogates when the identifier is inductively coupled to the reader. The system provides for short-range data communications and powering of the identifier by the reader when the devices are proximate to one another. The reader includes a coil for sending power and a separate coil for receiving data. The identifier includes a separate coil for receiving power and a separate coil for sending data. The separate coils within both the reader and the identifier are designed to have zero mutual inductance and therefore the two directions between the identifier and reader do not interact. Zero mutual inductance between coil antennas in the reader and between the coil antennas in the identifier is realized by placing coils together with the proper amount of overlap. Also, different frequencies may be used in the two directions. Power is sent continuously and data may be received and transmitted continuously and simultaneously between the identifier and the reader.

It is an advantage of the present invention that the two directions of communications between the reader and identifier devices are isolated from one another.

It is a further advantage of the present invention that an indefinite number of codes may be utilized.

Other objects and advantages of the present invention will become apparent to those skilled in the art after having read the following detailed description of the preferred embodiment which is illustrated in the figures of the drawing.

IN THE DRAWING

FIG. 1 is block-circuit diagram of an identification and recognition system of the present invention; and FIGS. 2A and 2B are sketch diagrams of the flux lines for two adjacent coils of FIG. 1 positioned to cancel the effects of flux linkages and thus have zero net interaction.

DESCRIPTION OF THE PREFERRED EMBODIMENT

Figures 2A, 2B:
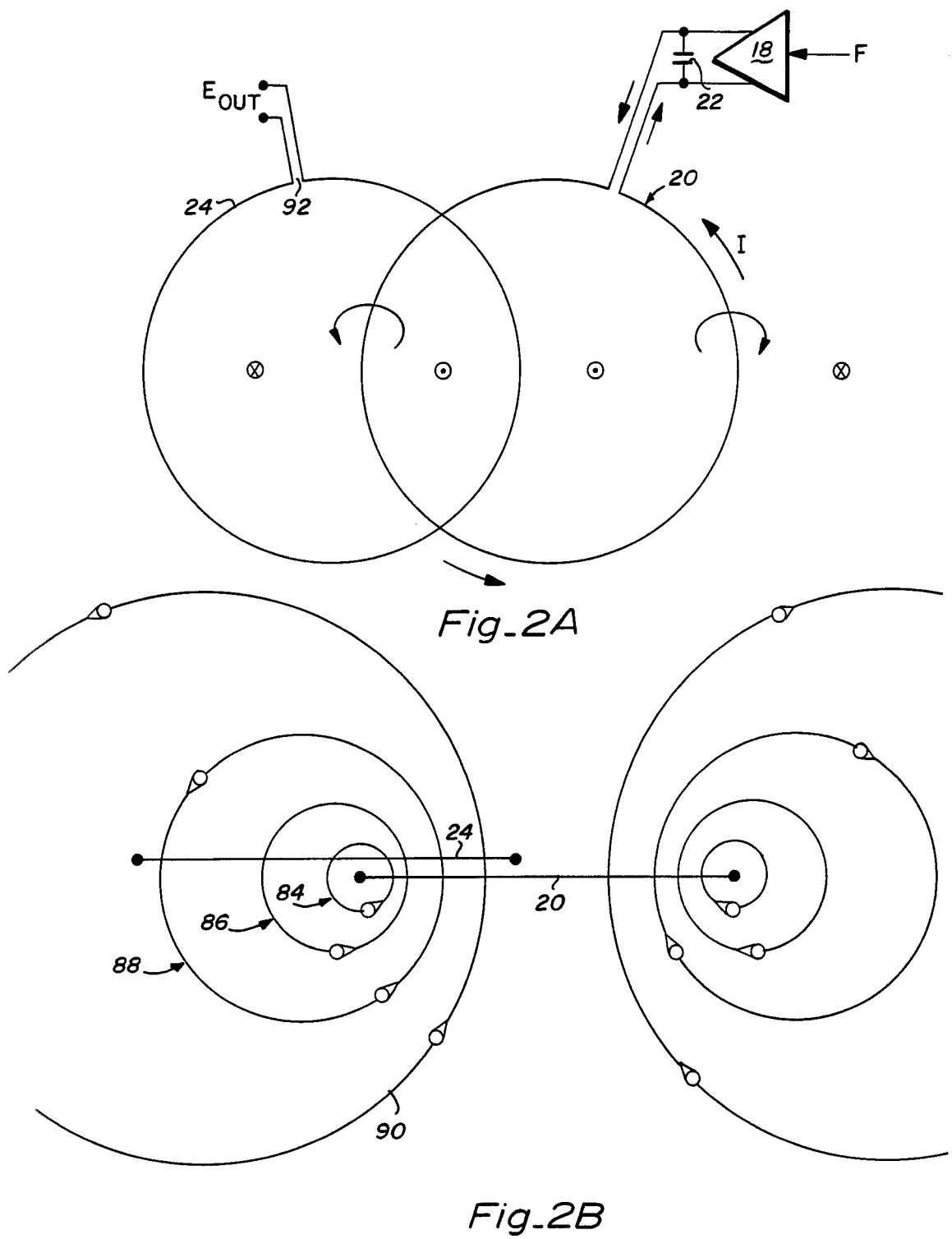

FIG. 1 illustrates an identification and recognition system of the present invention referred to by the general reference character 10. The system 10 includes a recognition (reader) section 12 and an identification section 14. The recognition section 12 is generally stationary, for example, associated with a door lock. The recognition section 12 receives power from the main power lines (not shown) and provides power to the identification section 14. In operation, the recognition section 12 receives data from the identification section 14 and then processes such data.

The recognition section 12 includes an oscillator 16 which is designed to operate at a frequency $F_1$. The frequency $F_1$ may be within one of various ranges suitable for transmitting power to the identification section 14. One frequency which has been found to be suitable for $F_1$ is 13.56 MHz, which is a frequency at which the Federal Communications Commission permits large power levels to be radiated without a license and where there are no communication services. Connected to the oscillator 16 is a power amplifier 18. A reader coil antenna 20 in parallel with a tuning capacitor 22 is tied in parallel to the output of the power amplifier 18. The coil antenna 20 establishes an inductance which in combination with capacitor 22 forms a resonant circuit.

A reader coil antenna 24 is positioned to be adjacent to and overlap the coil antenna 20, and is positioned such that the flux lines generated within coil antenna 24 from coil 20 are totally self-cancelling and no voltage from the coil antenna 20 is induced into the reader coil antenna 24. In essence, there is no coupling between the reader antenna coils 20 and 24 and the mutual inductance between them is zero.

As hereinafter discussed in further detail, the reader antenna coil 24 is adapted to receive modulated radio frequency signals from the identifier section 14. The coil antenna 24 is connected to a tuning capacitor 26 to form a parallel resonant circuit. Tied across the capacitor 26 is a receiver amplifier 28 which has an automatic frequency control circuit to track a predetermined carrier identification frequency $F_2$ which is of a value different than frequency $F_1$. The output of the receiver 28 is detected by a detector 30 and then amplified by an amplifier 32 to provide amplified signals on a line 34 to appropriate logic levels. The signals may then be transmitted through a logic processing network 36 to digitally filter noise. The logic signals are then transmitted to a data processor 38. Within the processor 38 the signals are matched with a code in the memory of codes within the data processor 38. Based upon the matching within the data processor 38, signals are in turn provided for operating devices such as alarms, doors, etc. in accordance with the program commands.

The coil antenna 20 of the reader 12 radiates an electromagnetic field illustrated by flux lines 40. The flux lines 40 reach the identifier section 14 when the identifier section is physically brought within the proximity of the recognition sector 12. The identifier section 14 has a first identifier coil antenna 42 which is tied in parallel to a tuning capacitor 44 to form a resonant circuit. Tied to a junction 45 of the coil 42 and capacitor 44, is a diode 46. Tied to the output of the diode 46 and to an identification section ground 47, common to the coil 42 and capacitor 44, is a capacitor 48. Thus, the voltage produced from the coil 42 is rectified by the diode 46 and smoothed with the capacitor 48 to produce a direct current voltage $V_{dd}$ across the capacitor 48.

An oscillator 52, which operates at the carrier identification frequency of $F_2$, is tied to the output of the diode 46 to receive the voltage $V_{dd}$. The frequency $F_2$ is typically lower than $F_1$ and is chosen high enough to be capable of efficiently radiating intelligence, but yet low enough that the power drain on the identifier section 14 is acceptably low. The oscillator 52 functions responsive to the existence of $V_{dd}$. By a line 54, the output of the oscillator 52 is connected to a counter 55 and by a line 56 is connected to an AND gate 57. The counter 55 reduces the frequency signal of the oscillator 52 to a data bit rate digital signal. The counter 55 is connected to a memory address 58 which in turn is connected to a memory 60. Thus, the counter 55 sequences the memory of address logic 58 and this logic selects the data from the memory 60. The memory 60 is tied by a line 62 to the AND gate 57 such that the output bits of memory 60 control the second half of the AND gate 57. The output of the gate 57 appears on a line 66. The signal on the line 66 is thus a radio frequency signal of frequency $F_2$ from oscillator 52 which is selectively gated with intelligence from the memory 60. The line 66 is tied to a coil antenna 68. The coil antenna 68 is tied in parallel to a tuning capacitor 70 of which one terminal is tied to ground 47 of identifier section 14. The inductor 68 is designed to have zero mutual inductance with the coil antenna 42 as was also the case between the coils 20 and 24 in the recognition section. Thus, the identifier section 14 is adapted to receive on the coil 42 flux lines 40 of a frequency of $F_1$ and radiate flux lines 72 of another frequency $F_2$. At the same time, however, there is no interaction between the flux lines and the two directions of communication.

To identify the code of the identification section 14, the flux lines 72 are coupled to the coil 24 which resonates with the tuning capacity 26. The resonant voltage is then amplified by receiver 28 and the automatic frequency control circuit tracks the frequency $F_2$. If the oscillator 52 is in the form of a crystal oscillator, the automatic frequency control feature of the receiver 28 may not be necessary. The output of the receiver 28 is then detected by the detector 30, and then this signal, which is modulated according to the contents of the memory 60 in the identification section, is then amplified by amplifier 32 to the logic levels on the line 34.

The logic levels are then transmitted to the data processor 38 which in turn matches the receive code with its memory codes and then takes the necessary logic and data processing steps as previously described.

FIGS. 2A and 2B are a schematic illustration of the positioning of the coils 20 and 24 relative to one another so as to establish zero mutual inductance. FIG. 2A illustrates the top view of two coils 20 and 24 and 2B illustrates the side view of the two coils which are designed to have zero net shared flux, or zero mutual inductance. The sketches illustrate the coil 24 in a plane slightly above the plane of the coil 20 and with partial overlap of the two coils. In operation, a current is injected into the coil 20 by the amplifier 18. The amplifier 18 is driven at frequency $F_1$. Based on the right-hand-thumb rule, flux lines wrap the turns of the coil 20 thereby producing an upward flux field through the center of coil 20 and a downward field outside of coil 20. Illustrative type lines of this field are labeled 84, 86, 88 and 90.

The coil 24 is intersected by the flux lines of fields 84, 86, 88 and 90. The voltage induced in the coil 24 from the coil 20 is proportional to the net flux intersections from the coil 20 through the coil 24. The induced voltage, represented as $E_2$ is measured at a gap 92 in the coil antenna 24. The coil antenna 24 is located in FIGS. 2A and 2B where the net flux is close to zero. If the coil 24 were moved further to the left, the upward flux lines 88 and 90 would not intersect the coil 20 whereas their downward values would. This would result in a net downward or negative flux through the coil antenna 24. If the coil antenna 24 is moved further to the right, the downward parts of the flux lines 86 and 88 would no longer intersect the coil antenna 24, but the upward lines of the flux lines 88 and 90 would, for a net upward or positive flux through the coil antenna 24. The coil antenna 24 is shown judiciously located for zero net flux, or zero mutual inductance. Flux and voltage affects in coil 20 are not coupled to the coil 24. By symmetry, the affects in coil 24 are not induced in the coil antenna 20. Further, the judicious location of coils 20 relative to 24 is also applied to the location of the coils 42 relative to coils 46.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An electronic proximity recognition and identification system comprising:
    a recognition section including an oscillator for supplying an electrical signal to a power amplifier electrically coupled to said oscillator, a first reader antenna connected to said power amplifier for radiating electromagnetic power responsive to said power amplifier, a second reader antenna for receiving signals, the mutual inductance between said first and second reader antennas being approximately zero; and
    an electronic identifier section having a first identifier antenna for receiving radiated power from said first reader antenna, means for generating an identifier carrier frequency, and a second identifier antenna for radiating signals of said identifier carrier frequency to said second reader antenna, the mutual inductance between said first and second identifier antennas being approximately zero.

2. The system of claim 1, wherein said first and second reader antennas are loop antennas.

3. The system of claim 1 wherein
    said first and second identifier antennas are loop antennas.

4. The system of claim 2 wherein
    said first and second identifier antennas are loop antennas.

5. The system of claim 1, wherein
    the identifier section includes logic and memory means for modulating said identification carrier frequency signal, and second identifier antenna for radiating said identification carrier frequency signal which signal is responsive to a code within said memory means.

6. The system of claim 5 wherein
    said first reader antenna inductively couples to said first identifier antenna, and the second identifier antenna inductively couples to said second reader antenna.

7. The system of claim 1, wherein
    said oscillator of the recognition section, oscillates within the radio frequency range; and
    said means for generating said identification carrier frequency operates within the radio frequency range.

8. The system of claim 2, wherein
    said first and second reader antennas are tuned with capacitances to predetermined radio frequencies.

9. The system of claim 8 wherein
    said first and second identifier antennas are tuned with capacitance to predetermined frequencies.

10. The system of claim 5, wherein
    the recognition section includes a data processing unit for processing codes of said received signals.

11. The system of claim 10 wherein
    the recognition section further includes a radio frequency amplifier electrically coupled to said second reader antenna.

12. The system of claim 11 wherein
    said radio frequency amplifier includes means for automatic frequency control for locking onto the identifier frequency.

* * * * *